(12) United States Patent
Bhaskar et al.

(10) Patent No.: US 10,432,510 B2
(45) Date of Patent: Oct. 1, 2019

(54) FORWARDING TABLE OF HYBRID SOFTWARE DEFINED NETWORKING SWITCH

(71) Applicant: HEWLETT PACKARD ENTERPRISE DEVELOPMENT LP, Houston, TX (US)

(72) Inventors: Abhay Bhaskar, Bangalore (IN); Rangaprasad Sampath, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 109 days.

(21) Appl. No.: 15/504,320

(22) PCT Filed: Apr. 7, 2015

(86) PCT No.: PCT/US2015/024704
§ 371 (c)(1),
(2) Date: Feb. 16, 2017

(87) PCT Pub. No.: WO2016/122696
PCT Pub. Date: Aug. 4, 2016

(65) Prior Publication Data
US 2018/0227224 A1    Aug. 9, 2018

(30) Foreign Application Priority Data

Jan. 30, 2015 (IN) .............................. 468/CHE/2015

(51) Int. Cl.
*H04L 29/06* (2006.01)
*H04L 12/715* (2013.01)
*H04L 12/717* (2013.01)
*H04L 12/721* (2013.01)
*H04L 12/741* (2013.01)
*H04L 12/751* (2013.01)

(52) U.S. Cl.
CPC .............. *H04L 45/38* (2013.01); *H04L 45/02* (2013.01); *H04L 45/42* (2013.01); *H04L 45/64* (2013.01); *H04L 45/745* (2013.01); *H04L 63/20* (2013.01)

(58) Field of Classification Search
CPC ......... H04L 45/38; H04L 45/64; H04L 45/42; H04L 45/745; H04L 45/02; H04L 63/20
See application file for complete search history.

(56) References Cited

U.S. PATENT DOCUMENTS

2013/0195113 A1   8/2013  Kotha et al.
2013/0266007 A1   10/2013  Kumbhare et al.
(Continued)

FOREIGN PATENT DOCUMENTS

CN       103209121 A    7/2013
EP       2787698 A2    10/2014

OTHER PUBLICATIONS

Open Networking Foundation, OpenFlow Switch Specification, Version 1.5.0, Dec. 19, 2014. (Year: 2014).*
(Continued)

*Primary Examiner* — Oussama Roudani
(74) *Attorney, Agent, or Firm* — Hewlett Packard Enterprise Patent Department

(57) ABSTRACT

A hybrid software defined networking (SDN) switch has a forwarding table including local flow entries and SDN flow entries. In one example, the hybrid SDN switch may send both local flow entries and SDN flow entries to a SDN controller.

14 Claims, 10 Drawing Sheets

(56) References Cited

U.S. PATENT DOCUMENTS

| | | | | |
|---|---|---|---|---|
| 2013/0272135 | A1* | 10/2013 | Leong | H04L 41/0823 370/241 |
| 2013/0329601 | A1 | 12/2013 | Yin et al. | |
| 2014/0112190 | A1 | 4/2014 | Chou et al. | |
| 2014/0149542 | A1 | 5/2014 | Luo et al. | |
| 2015/0016449 | A1 | 1/2015 | Tardo | |
| 2016/0065454 | A1* | 3/2016 | Arumugam | H04L 45/38 370/389 |
| 2017/0034005 | A1* | 2/2017 | Liang | H04L 41/12 |

OTHER PUBLICATIONS

Dan Levin et al., "Incremental SDN Deployment in Enterprise Networks," SIGCOMM'13, Aug. 12-16, 2013, Hong Kong, China, pp. 473-474, ACM.

International Search Report and Written Opinion, International Application No. PCT/US2015/024704, dated Oct. 27, 2015, pp. 1-9, KIPO.

Santha Rami Reddy, "Magic of SDN in Networking," Whitepaper, Dec. 17, 2013, pp. 1-13, Calsoft Labs, Available at: <sdn.calsoftlabs.com/downloads/WhitePapers/Magic-of-SDN-in-Networking.pdf>.

Stefano Vissicchio et al, "Opportunities and Research Challenges of Hybrid Software Defined Networks," Feb. 15, 2014, pp. 1-6, Available at: <ietf.org/proceedings/89/slides/slides-89-sdnrg-0.pdf>.

Wikipedia, "Simple Network Management Protocol", (webpage), available online at <https://en.wikipedia.org/w/index.php?title=Simple_Network_Management_Protocol&oldid=760664729>, Jan. 18, 2017, 13 pages.

Software Defined Networking (SDN)—Open Flow, available online at <https://www.ics.uci.edu/~magda/ics_x33/module_SDN.pdf>, 35 pages.

Open Networking Foundation, "OpenFlow Switch Specification", Version 1.4.0 (Wire Protocol 0x05), ONF TS-012, Oct. 14, 2013, 206 pages.

Open Networking Foundation, "OpenFlow Switch Specification", Version 1.1.0 Implemented (Wire Protocol 0x02), ONF TS-002, Feb. 28, 2011, 58 pages.

International Preliminary Report on Patentability received for PCT U.S. Appl. No. 15/319,688, dated Aug. 10, 2017, 8 pages.

"Ryu—An open source OpenFlow controller" (webpage), available online at <http://osrg.github.io/ryu/>, 2017, 2 pages.

"CPqD/NOX 1.3 controller", (webpage), available online at <https://github.com/CPqD/nox13oflib>, 2013, 2 pages.

* cited by examiner

FORWARDING TABLE OF HYBRID SOFTWARE DEFINED NETWORKING SWITCH

BACKGROUND

As used herein the term "switch" is used generally to mean a network device for forwarding data such as a layer 2 switch, layer 3 switch or router etc. A switch includes a control plane which determines forwarding policies and a data plane which carries out the actual forwarding of data. The data plane includes a forwarding table which stores forwarding entries. The forwarding entries may be programmed into the forwarding table by the control plane. The control plane may generate the forwarding entries based on data forwarding policies and manage the forwarding entries in the data plane. In a traditional approach to networking, both the control plane and the data plane are located in the network switch. That is the network switch has a local control plane that manages the data plane of the switch.

Software defined networking (SDN) is an approach in which the control plane and the data plane are handled by separate devices. A SDN switch includes a forwarding table and forwards traffic flows based on the contents of the forwarding table. However, the data plane of a SDN switch is managed by a remote SDN controller, rather than a local control plane of the switch. The remote SDN controller may, for example, be a server which acts as an SDN control plane. The SDN controller may, for example, instruct adding entries to, or deleting entries from, the SDN switches forwarding table. The OpenFlow Protocol (OFP) is one example of an SDN protocol which is currently gaining acceptance in the marketplace.

A hybrid SDN switch is a switch which supports both traditional networking and SDN networking. A hybrid SDN switch has a forwarding table that may be programmed and managed by either a local control plane of the hybrid SDN switch, or by a remote SDN controller. Thus, the data plane of a hybrid SDN switch may comprise both SDN flow entries, programmed by a remote SDN controller, and local flow entries programmed by a local control plane of the switch.

BRIEF DESCRIPTION OF THE DRAWINGS

Examples will now be described, by way of non-limiting example only, with reference to the accompanying drawings, in which.

DETAILED DESCRIPTION

In the following description the terms "a" and "an" are used to denote the presence of one or more of a particular element. The phrase "a material selected from the group comprising" following by a list of materials means the material comprises one or more materials selected from the list.

Examples will now be described in more detail with reference to the accompanying drawings.

Figure 1:
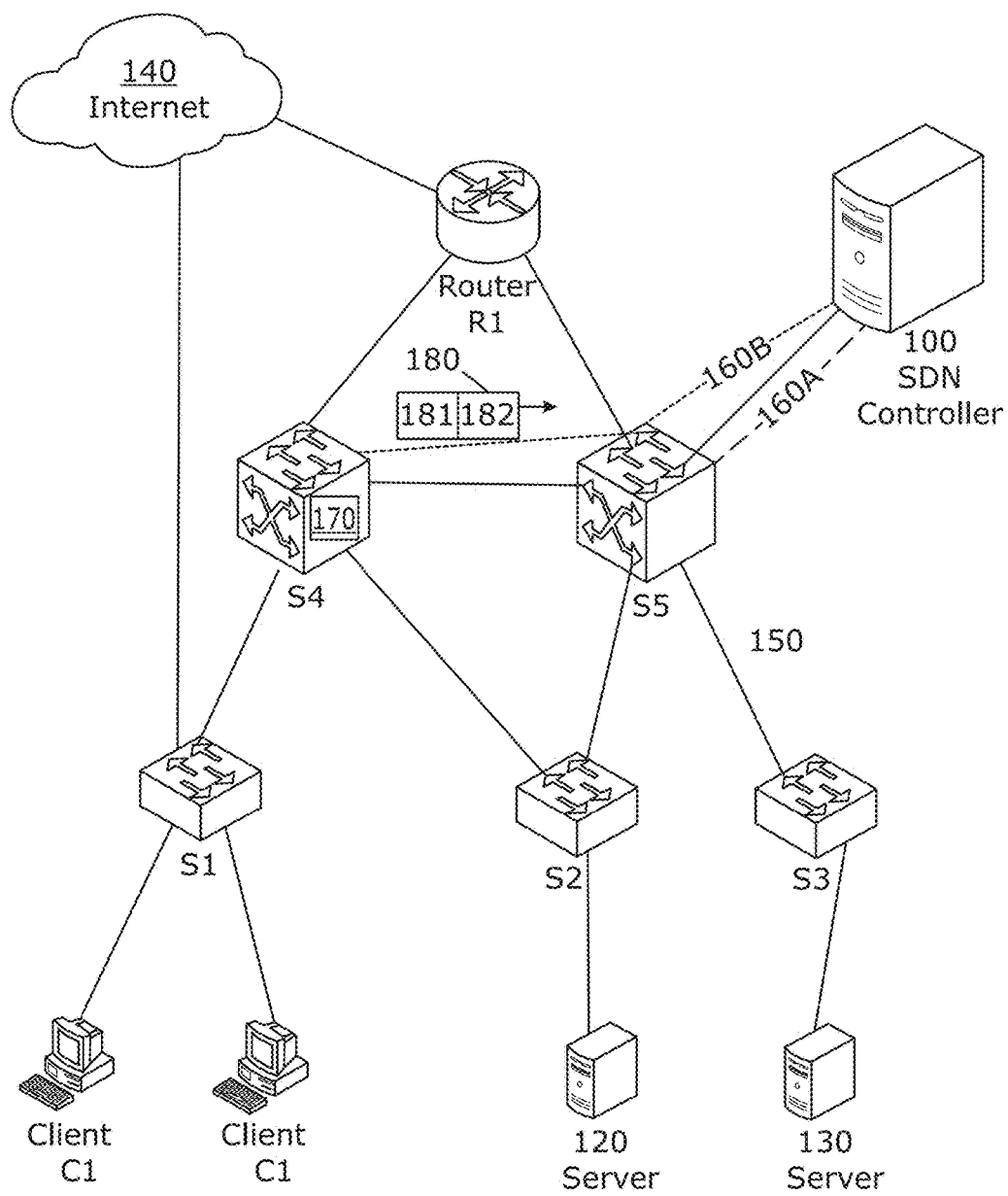
FIG. 1 is a diagram of a network including a hybrid SDN switch.

FIG. 1 shows an example computer network including a plurality of network switches, client devices and servers. Client devices C1 and C2, such as personal computers, laptops, tablets, computer terminals etc, connect to the network via access layer switches S1, S2 and S3. Access layer switches S1, S2 and S3 connect to aggregation layer switches S4 and S5. Aggregation layer switches S4 and S5 connect to a Router R1. The router R1 may be thought of as a switch at layer 3 and connects the network to the Internet 140. The connections 150 between these devices are shown in solid lines and may be any suitable connecting medium, such as Ethernet. The switches forward traffic through the network to enable the clients C1, C2 to communicate with the servers 120, 130 and for the clients and/or servers to connect to the Internet 140.

In the illustrated example, switches S1, S2 and S3 are switches without SDN capability, i.e. they are non-SDN switches. Each such non-SDN switch has its own local control plane that programs and manages a data plane of the non-SDN switch. Switch S5 is a pure SDN switch. A pure SDN switch does not have a local control plane and instead all the entries in its data plane are programmed by a SDN controller. FIG. 1 shows an SDN controller 100, which may for example be a server running SDN controller software. The SDN controller 100 communicates with the SDN switch S5 via a SDN channel 160A shown in dashed lines. A SDN channel is a communication link between the SDN controller and a SDN switch managed by the SDN controller. The SDN channel may be a dedicated communication path or may set up as a communication channel over the underlying network infrastructure for sending SDN protocol messages. For instance, the SDN protocol messages may be sent over TCP or through a secure link such as TLS or SSL.

Switch S4 is a hybrid SDN switch. A hybrid SDN switch is a switch that has a local control plane, but which can also be programmed by a SDN controller. The hybrid SDN switch S4 includes a forwarding table and a local control plane. The forwarding table of the hybrid SDN switch may be programmed by the local control plane of the hybrid SDN switch S4 or by the SDN controller 100. Thus the forwarding table of the hybrid SDN switch may include both "SDN flow entries" 312 programmed by a SDN controller and "local flow entries" 314, programmed by a local control plane. The SDN controller 100 communicates with the switch S4 over a SDN channel 160B shown in dotted lines. In one example the SDN channel 160B utilizes the underlying network infrastructure and may be transparent to intermediate devices. The SDN channel may be a secure channel, such as SSL or TLS. Packets sent via the SDN channel are in accordance with a SDN protocol. One example of a SDN protocol is the OpenFlow protocol, but the current disclosure is not limited thereto and the same principles may be applied to other SDN protocols.

Hybrid SDN switch S4 includes a module 170 that sends both SDN flow entries and local flow entries over the SDN channel 160B to the SDN controller. The flow entries may be sent in response to a request from the SDN controller 100. An example of a message 180 sent over the SDN channel 160B, including both a local flow entry 181 and a SDN flow entry 182, is shown in FIG. 1.

As both local and SDN flow entries are sent to the SDN controller 100, the SDN controller may have a fuller picture of the network. The SDN controller may use this information in formulating forwarding strategies. Furthermore, as will be discussed later, receiving both SDN flow entries and local flow entries may enable the SDN controller to detect conflicts between SDN flow entries and local flow entries in the hybrid SDN switch.

It should be understood that FIG. 1 is just an illustrative example of one possible network and that the teachings of the present disclosure may be applied to many different types and structure of network. In other examples, the network may have more switches or fewer switches and more layers or fewer layers. For instance, some networks may have an access layer, but no aggregation layer. While FIG. 1 shows a mixture of non-SDN switches, pure SDN switches and hybrid SDN switches, in other examples a network may contain no pure SDN switches, or may not contain non-SDN switches. While, for the purposes of illustration, FIG. 1 shows just one hybrid SDN switch in the aggregation layer, in other examples some, or all, of the other aggregation layer switches and some, or all, of the access layer switches may be hybrid SDN switches.

In the above example the hybrid SDN switch S4 carries out functions traditionally associated with layer 2 forwarding. That is a local control plane and a SDN controller of the hybrid SDN switch may program layer 2 type forwarding entries. However, the present disclosure is not limited to this, and in other examples, with suitable programming by a layer 3 capable local control plane and/or a SDN controller, a hybrid SDN switch may carry out functions traditionally associated with a layer 3 switch or router. Thus, in some examples, the router R1 may be replaced by a hybrid SDN switch.

Figure 2:
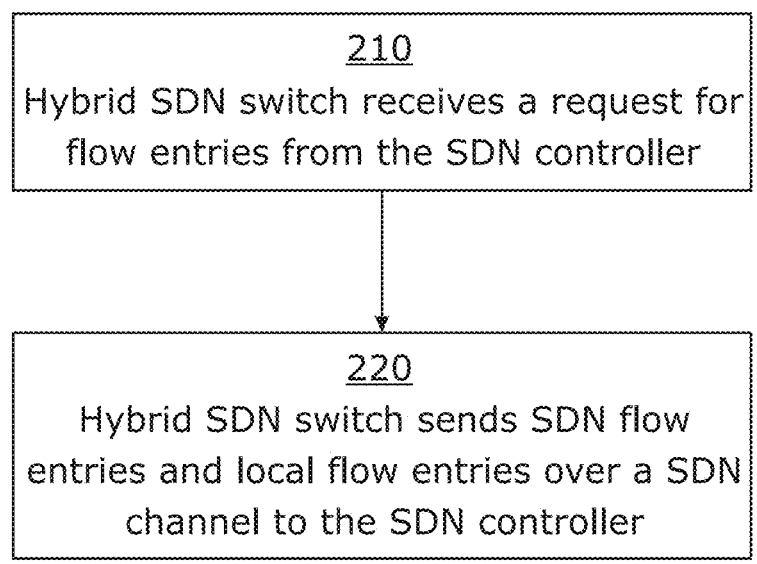
FIG. 2 is a flow diagram showing an example of sending SDN flow entries and local flow entries to a SDN controller.

FIG. 2 is a flow diagram from the perspective of a hybrid SDN switch, such as switch S4 of FIG. 1. The flow diagram shows one example method of providing a SDN controller access to flow entries in a forwarding table of the switch.

At block 210 the hybrid SDN switch receives a request for flow entries.

The request is sent from the SDN controller 100 and may be sent over a SDN channel 160B linking the hybrid SDN switch S4 with the SDN controller. The request may be in a format specified by the SDN protocol.

At block 220, in response to this request from the SDN controller, the hybrid SDN switch sends both SDN flow entries and local flow entries to the SDN controller. In one example, all flow entries in the requested forwarding table are sent to the SDN controller. In other examples, only a subset of the entries may be sent according to the parameters of the request. The SDN flow entries and the local flow entries are sent over the SDN channel 160B which links the hybrid SDN switch S4 with the SDN controller 100. The local flow entries may be converted to SDN format before sending, as discussed in more detail later.

As the local flow entries are sent over a SDN channel, such as an OpenFlow channel, the method may be implemented using SDN techniques as described herein. It is not necessary for the SDN controller to be capable handling simple network management protocol (SNMP), representational state transfer (REST) or other protocols for enquiring about local forwarding table entries. For instance, a SDN controller without SNMP functionality may still use the method disclosed herein to access local flow entries of the hybrid SDN switch. Examples disclosed herein thus provide a relatively simple method by which a variety of SDN controllers, including simple SDN controllers without extensive non-SDN functionality such as SNMP, may access local flow entries of a hybrid SDN switch.

Figure 3:
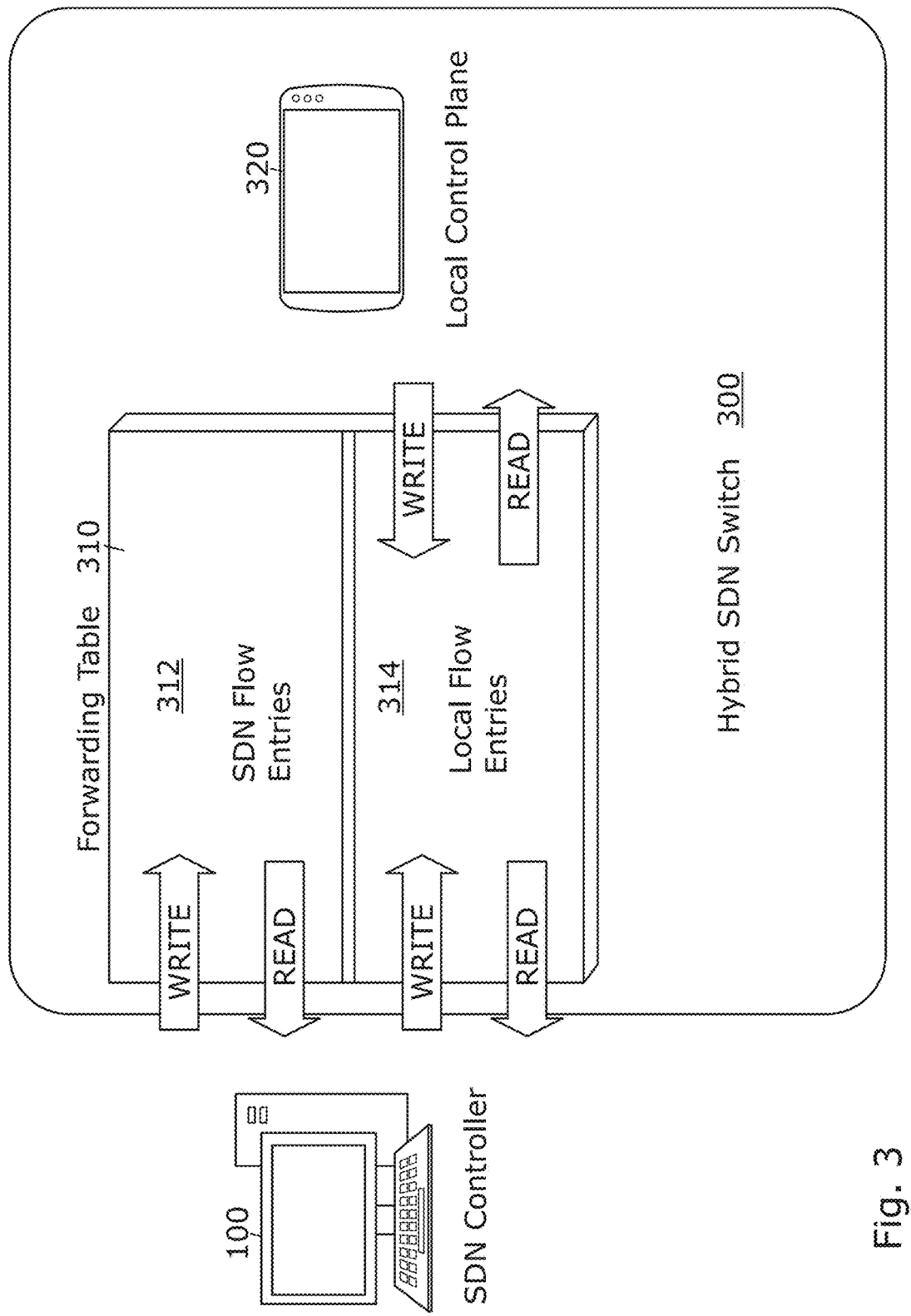
FIG. 3 is a schematic diagram showing an example of a SDN controller and a hybrid SDN switch.

If the local control plane is considered to be a first control plane of the hybrid SDN switch, then the remote SDN controller may be considered to be a second control plane of the hybrid SDN switch. FIG. 3 shows a schematic example of the communication between a forwarding table of a hybrid SDN switch and its control planes in more detail. The hybrid SDN switch 300 includes a forwarding table 310 for storing flow entries. Each flow entry may, for instance, define a set of matching conditions and an action to be taken if an incoming flow meets the matching conditions. The forwarding table 310 may include a non-transitory storage medium, such as a memory, TCAM (ternary content-addressable memory) or other machine readable storage medium.

A first set of flow entries are programmed into the forwarding table 310 by the SDN controller 100. These flows are called 'SDN flow entries' as they originated from the SDN controller. A second set of flow entries are programmed into the forwarding table by a local control plane 310 of the hybrid SDN switch. In the illustrated example, the SDN flow entries are stored in a first section of the table 312, while the local flow entries are stored in a second section of the table 314. In other examples, the SDN flow entries and local flow entries may not be separated into separate predefined sections, but instead, each entry, whether local flow entry or a SDN flow entry, may be stored in any appropriate free slot at the time it is written to the forwarding table. In one example, rows in the table may be filled in order on a first come first served basis. Regardless of whether the forwarding table is split into pre-defined sections or not, each flow entry in the forwarding table will have originated either from a local control plane of the switch, or from a SDN controller Thus each flow entry is either a local flow entry or a SDN flow entry.

As shown in FIG. 3, the local control plane 320 is able to both read and write local flow entries to the forwarding table. In this context the term "write" means to program entries into the forwarding table and includes generating new entries, modifying existing entries and deleting existing entries. The local control plane 320 may program entries in accordance with appropriate forwarding rules and policies.

For example if the local control plane is to program layer 2 forwarding entries, then the entries may be determined by protocols such as ARP learning, MAC learning and STP etc. If the local control plane is to program layer 3 forwarding entries, then routing policies such as link state routing protocol (LSR), border gateway protocol (BGP), autonomous system to autonomous system (AS-AS), only shortest path first (OSPF) etc may be used.

The SDN controller 100 may read and write SDN flow entries to the forwarding table. Further, according to the present disclosure, the SDN controller may be able to read local flow entries in the forwarding table. In some cases the SDN controller may also be able to write to, e.g. modify or delete, local flow entries in the forwarding table. This is in contrast to a conventional hybrid SDN switch. In a conventional hybrid SDN switch, the SDN controller does not have access to the local forwarding entries and is not able to read or write local flow entries in the forwarding table.

The level of access of the SDN controller 100 to the local flow entries stored in the forwarding table 300 may depend upon an access policy of the forwarding table. For example the forwarding table may have an access policy of "no access" which prevents a SDN controller from accessing local flow entries, an access policy of "read only" which allows reading, but not writing, and an access policy of "read and write" which allows both reading and writing of local flow entries by the SDN controller.

It should be noted that while FIG. 3 shows just one SDN controller and just one local control plane, it is possible for a hybrid SDN switch to have several local control planes and/or to be managed by several SDN controllers. In that case each of the plurality of local control planes may read and write local flow entries to the forwarding table. Likewise, each SDN controller may read or write SDN flow entries to the forwarding table and may read or write local flow entries to the extent allowed by the access policy of the forwarding table.

It should also be noted that while FIG. 3 shows just one forwarding table, in some examples a hybrid SDN switch may have a plurality of forwarding tables. In that case each forwarding table may have its own access policy determining the level of access of different control planes to various types of flow entry. For example each forwarding table may independently set its own level of permitted access by a SDN controller. The levels of permitted access may for example be no access, read only, or read and write.

Figure 4:
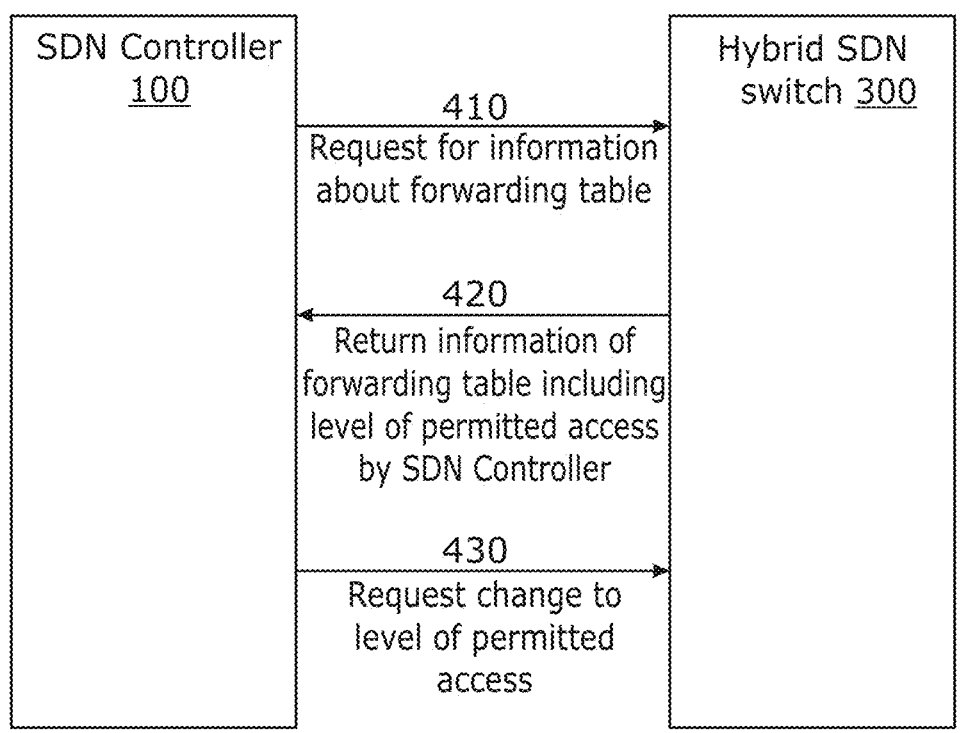
FIG. 4 is a diagram showing an example of a SDN controller requesting information about a forwarding table of a hybrid SDN switch.

From the above, it can be seen that the level of access a SDN controller has to local flow entries of a forwarding table depends on the access policy of the forwarding table. FIG. 4 is a flow diagram showing one example method by which a SDN controller may ascertain the access policy of a forwarding table of a hybrid SDN switch.

At 410 the SDN controller 100 sends a request for information about a forwarding table of the hybrid SDN switch 300.

The request may, for instance, be a request for general properties of the table, or a specific request about the level of access to local entries which the table permits the SDN controller. The request may be sent over the SDN protocol channel between the SDN controller and the hybrid SDN switch. The request may be a command defined by the SDN protocol. In one example the request is a OFMP_TABLE_DESC message in the OpenFlow protocol.

At 420 the hybrid SDN switch 300 returns information about the forwarding table to the SDN controller 100. The information includes at least the level of permitted access by the SDN controller to local flow entries in the forwarding table. In some examples the information may include other general properties of the table.

The properties may be sent by way of a message over the SDN channel and the message may be formatted in accordance with the SDN protocol. The level of permitted access may be defined by one field of the message.

In one example, in which the SDN protocol is OpenFlow, the information may be returned to the SDN controller 100 by OpenFlow in a OFMP_TABLE_DESC reply message. The OFMP_TABLE_DESC reply message may include an array describing the table, such as struct ofp_table_desc, which is defined in the OpenFlow protocol. One field of the array may be used to indicate the permitted access level. That is the openflow protocol may be modified to include a field which defines the level of permitted access by a SDN controller to local flow entries. The levels of permitted access may for example be defined as none, read only, or read and write.

For example, the current openflow protocol includes a table mod property type OFPTMP_Experimenter field, which is undefined. This OFPTMP Experimenter field could be conveniently used to carry information relating to the permitted level of access. In one example, the field may be defined as follows:—

```
struct ofp_table_mod_prop_control_plane_flow_access {
    uint16_t type; /* OFPTMPT_EXPERIMENTER. */
    uint16_t length; /* Length in bytes of this property. */
    uint32_t mode; /* One of the Access Level Type */
};
```

The access mode can be set to any of the following values.

```
/* Access Mode Types. */
    enum ofp_table_mod_prop_control_plane_flow_access_mode {
    OFPTMPCPF_NONE = 1,
    OFPTMPCPF_READ = 2,
    OFPTMPCPF_WRITE = 3,
```

Where "none" means no access, "read" means read only access, and write means read and write access.

The SDN controller receives the information relating to the permitted level of access. Then at 430, if the permitted level of access is different to a desired level of access, the SDN controller may request the hybrid SDN switch to change the level of permitted access to local flow entries in the forwarding table. The request may be sent by way of the SDN protocol over the SDN channel.

In one example the request may be in the form of a table modification command. For example, where the SDN protocol is OpenFlow, the request may be by an OFP_TABLE_MOD message. For instance, a new specific field may be defined in the protocol for this purpose, or the OFMPT_EXPERIMENTER field of the OFP_TABLE_MOD message may be used as described above.

The hybrid SDN switch may change the level of permitted access in response to this request and may send an acknowledgement.

Figure 5:
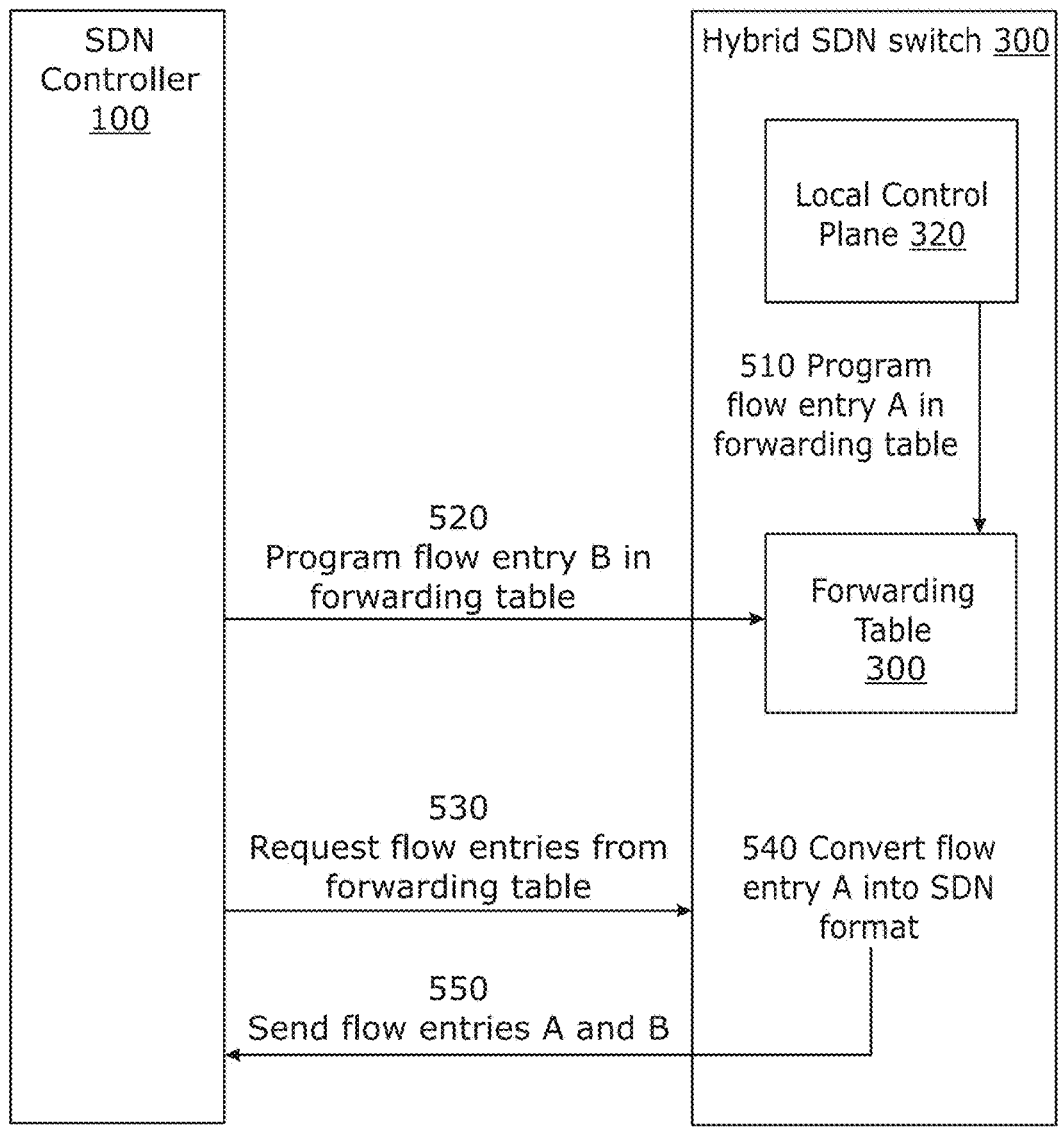
FIG. 5 is a diagram showing an example of a hybrid SDN switch sending SDN flow entries and local flow entries to a SDN controller.

FIG. 5 is a diagram showing an example method of providing a SDN controller access to SDN flow entries and local flow entries in more detail.

As shown in the diagram, the hybrid SDN switch includes a forwarding table 310 and a local control plane 320. There may be other local control planes and other forwarding tables, but in the interest of clarity, just one local control plane and one forwarding table are shown in FIG. 5.

At 510 the local control plane 320 writes a flow entry A into the forwarding table 310. As the flow entry A is written by the local control plane it is a 'local flow entry'. One flow entry A is shown in FIG. 5 for the purposes of illustration, however in practice a plurality of flow entries may be written by the local control plane. These local flow entries may be written according to certain forwarding policies when the hybrid SDN switch is first configured and/or over time as the appropriate output port for certain flows is discovered by the local control plane.

At 520 the SDN controller 100 writes a flow entry B into the forwarding table 310. This is may be done using conventional SDN methods. For instance, the flow entry is sent to hybrid SDN switch over the SDN channel with an instruction to write the flow entry into the forwarding table. While just one flow entry B is shown in FIG. 5 for clarity, in practice a plurality of flow entries may be programmed into the forwarding table 310 by the SDN controller.

At 530 the SDN controller 100 sends, to the hybrid SDN switch 300, a request for flow entries in the forwarding table 310. The request may, for instance, be a request for all flows entries in all tables in the switch, a request for all the flow entries in the forwarding table 310, or a request for a subset of flow entries. The request may be a command, or message, defined in a SDN protocol and may be sent over the SDN channel.

In one example the SDN protocol is the OpenFlow protocol. In one example the request for flow entries is a OFP_FLOW_STATS message in the OpenFlow protocol, which is a message requesting all the flow entries in a particular forwarding table.

At 540 the hybrid SDN switch 300 converts local flow entries, such as flow entry A, into a SDN format. The SDN format is a format which is defined by the SDN protocol. While in FIG. 5 this conversion operation is carried out in response to the request for flow entries from the SDN controller, in other examples the conversion operation may be carried out ahead of time, before receiving a specific request.

At 550 the SDN hybrid switch sends the local flow entries, such as entry A, converted into SDN format to the SDN controller 100 over the SDN channel. The switch also sends the SDN flow entries, such as flow entry B, to the SDN controller in the SDN format.

In the above example, as the flow entries are all received by the SDN controller in SDN format. The SDN controller can thus easily compare and analyze all the flow entries together. Therefore, even a relatively simple SDN controller which is not aware of different types of flow entry format, and which is not capable of converting non-SDN flow formats to SDN flow formats, is able to examine the local flow entries. This approach of carrying out the conversion at the switch end also makes it easier for the SDN controller to manage various different models of hybrid SDN switch, or various hybrid SDN switches from different vendors, which may use a variety of different local flow entry formats. However, in other examples the conversion may be carried out at the SDN controller end.

In one example, the SDN controller may be an OpenFlow controller and may send a standard OpenFlow message OF_FLOW_STATS at block 530. A conventional hybrid SDN switch would send SDN flow entries in response to this OF-FLOW_STATS message, but would not send local flow entries. However, the hybrid SDN switch according to this example sends both OpenFlow entries and local flow entries converted into OpenFlow format.

A SDN protocol defines a SDN format for flow entries and this SDN format is used for any local copies of the flow entries stored on a SDN controller, as well as for any analysis or operations carried out by the SDN controller. On the switch end flow entries may be stored in a software forwarding table or a hardware forwarding table. A SDN flow entry may be stored by the switch in SDN format if the forwarding table is a software forwarding table. However, if the SDN flow entry is stored in a hardware forwarding table, then it will be stored as raw data, e.g. 1 s and 0s, in cells of the forwarding table.

Likewise, a local control plane may define a local flow entry format specific to the local control plane. This format is generally different to the SDN format. The local flow entry format is used for analysis and operations carried out by the local control plane. When the local control plane stores flow entries in a software forwarding table, the flow entry may be stored in the local flow entry format. However, any entries written by the local control plane into a hardware forwarding table, are written as raw data, e.g. 1s and 0s.

Thus, if local flow entries, stored in a software forwarding table of the hybrid SDN switch, are to be sent to the SDN controller in SDN format, they should first be converted from the local flow entry format to SDN format. Likewise, if local flow entries, stored in a hardware forwarding table of the hybrid SDN switch, are to be sent to the SDN controller in SDN format, they should first be converted from raw data to SDN format. These conversions may be carried out by a processor of the hybrid SDN switch. In one example the conversion is carried out in response to the request from the SDN controller. As such the conversion may be carried out on demand, e.g. in response to the request for flow entries. However, in the case of software forwarding table entries, these may be carried out on demand, or may be converted from local flow entry format to SDN format ahead of time. For instance local flow entries may be converted to SDN format before storing in a software forwarding table, or may be written to the software forwarding table in local flow entry format, but converted periodically to SDN format.

Further, a hybrid SDN switch may make a software backup of the flow entries of a hardware forwarding table. Any software backup may be stored in SDN format, or may be stored in the local flow entry format and converted to a SDN format before sending to a SDN controller.

Table 1 shows an example of the same flow entry in both OpenFlow format and a local flow entry format. The example flow entry matches flows having a VLAN of 5 and MAC destination address of aa:aa:bb:bb:cc:cc and sends them out of port 2.

TABLE 1

| Local Flow Entry Format | OpenFlow format |
| --- | --- |
| Match on VLAN 5 & on MAC_DA aa:aa:bb:bb:cc:cc Action - Output Port 2 | Match => {OXM_VLAN_ID = 5, OXM_ETH_DST = aa:aa:bb:bb:cc:cc APPLY_ACTION => {Outport = P2} |

The hybrid SDN switch is able to convert flows entries between the local control plane format and a SDN format, such as OpenFlow.

As the SDN controller 100 receives both local flow entries in SDN format, it may analyze them to obtain a more complete picture of the network. In some cases, a SDN controller may do this before programming any SDN flow entries into the hybrid SDN switch. That is the SDN controller, or its operator, may first wish to model and understand existing network traffic flows before changing them with SDN.

Further, the SDN controller may be better able to understand the outcome of SDN flows which it programmed itself. For instance, SDN flow entries sometimes include an action of "use local control plane" which means to use the local control plane to forward to the flow. In OpenFlow this is known as a flow entry with an action of "normal". A hybrid SDN switch which receives a flow matching a flow entry having a "normal" action will forward the flow according to the local flow entries of the hybrid SDN switch. For a conventional hybrid SDN switch, the SDN controller will not know where such a flow will be forwarded. However, for a hybrid SDN switch according to the present disclosure, the SDN controller may read the local flow entries from the hybrid SDN switch's forwarding table and thus know where a flow matching a "normal" action entry will be forwarded.

Figure 6:
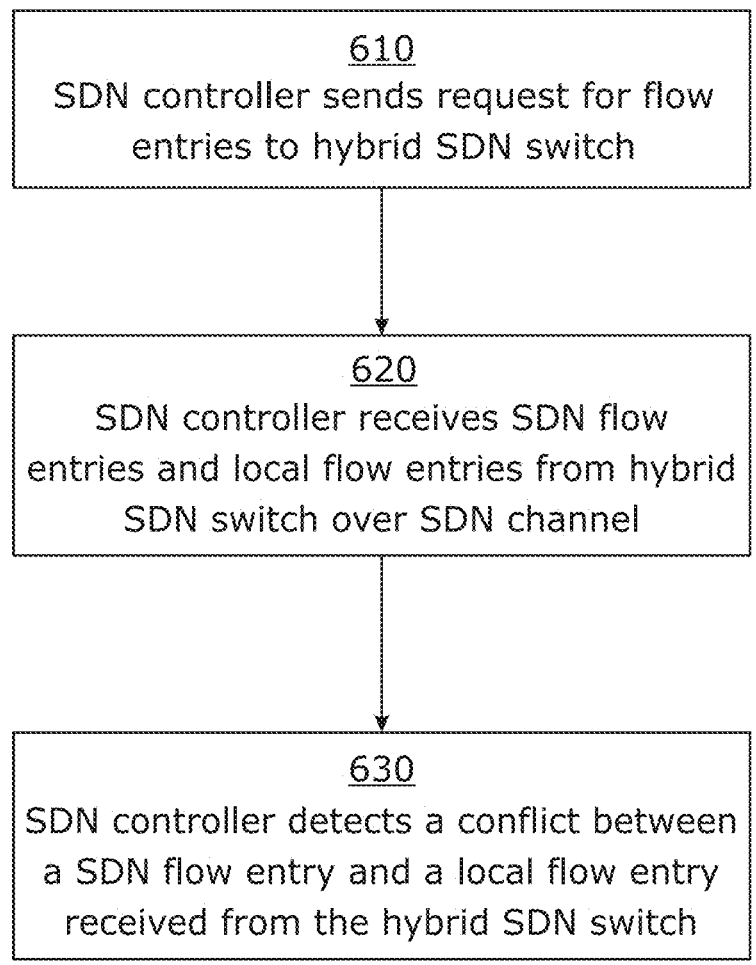
FIG. 6 is a flow diagram showing an example method of a SDN controller detecting a conflict between SDN flow entries and local flow entries.

Furthermore, the SDN controller 100 may examine the SDN flow entries and local flow entries and determine if there are any conflicts between the two. FIG. 6 is a flow chart showing an example method of determining flow entry conflicts by a SDN controller.

At block 610 the SDN controller sends a request for flow entries from the forwarding table as previously discussed.

At block 620 the SDN controller receives both SDN flow entries and local flow entries, as described above.

At block 630 the SDN controller detects whether there is a conflict between a SDN flow entry and a local flow entry.

The SDN controller may for example detect a conflict by determining if a local flow entry provides a different action for a matching flow, compared to an action for a SDN flow entry that matches some of the same flows. For example, if the matching criteria of a SDN flow entry and a local flow entry are the same, but their actions different, then it is clear there is a conflict. In other cases, the conflict may not be as clear, but may still be detected by the SDN controller. For instance, the matching criteria of the local flow entry may overlap with, but not be exactly the same as, a SDN flow entry. If the overlapping local flow entry and SDN flow entry give different actions then there will be a conflict. For instance, a flow entry matching a particular virtual local area network (VLAN) may conflict with a flow entry specifying a port that happens to be in said VLAN.

After detecting a conflict between a SDN flow entry and a local flow entry, the SDN controller may generate an alert for a network manager and/or may take corrective action to resolve the conflict by modifying or deleting one of the conflicting flow entries. In one example, where the SDN controller has write access to the local flow entries in the forwarding table of the hybrid SDN switch, the SDN controller may delete the local flow entry so that the hybrid SDN switch follows the policy originally intended by the SDN controller.

Figure 7:
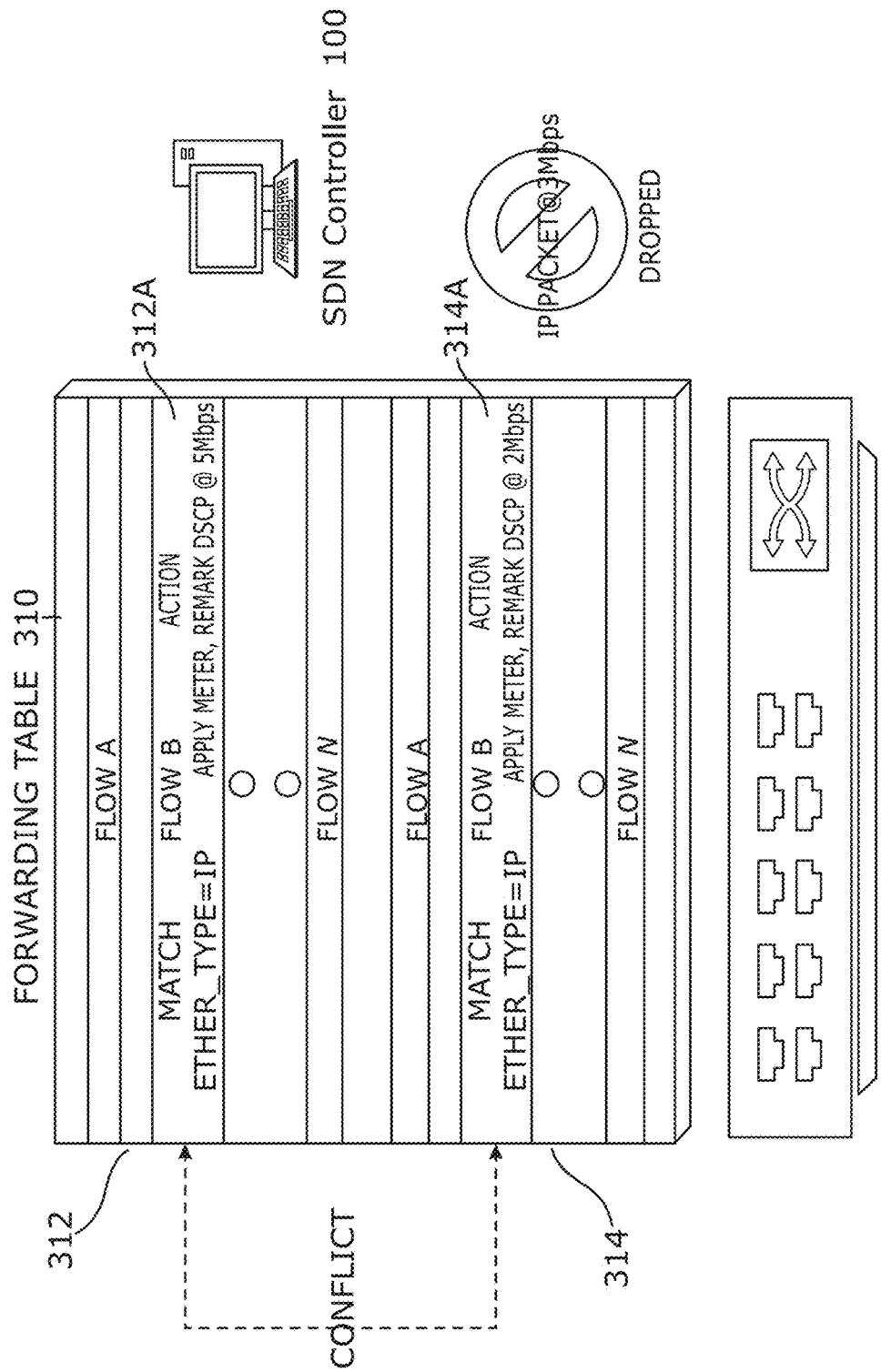
FIG. 7 shows an example of a Quality of Service conflict.

FIG. 7 shows an example where a Quality of Service (QoS) policy of a local control plane conflicts with a QoS policy of a SDN controller. The forwarding table 310 stores a plurality of SDN flow entries 312 and a plurality of local flow entries 314. One of the SDN flow entries 312A specifies that IP packets in a flow incoming at a rate of more than 5 Mbps should be dropped. Meanwhile, one of the local flow entries 314A specifies that IP packets in a flow incoming at a rate of more than 2 Mbps should be dropped. On examining these flow entries, the SDN controller may detect that this is a conflict. Based on the flow entries it had programmed, the SDN controller would expect IP flows amounting to a rate of more than 5 Mbps to be dropped. However, the hybrid SDN switch will in fact drop any flows amounting to a rate more than 2 Mpbs. For instance, contrary to the policy in the SDN flow entry 312A, IP packets in a flow will be dropped once the rate of 2 Mbps would be exceeded. Thus, for example, IP packets in a flow having a rate of 3 Mbps would be dropped.

Fortunately, according to the present disclosure, the SDN controller is able to detect this conflict by comparing the SDN flow entries and local flow entries. The SDN controller then may generate an alert to bring the conflict to the attention of a network manager and/or may resolve the conflict, for instance by modifying or deleting one of the conflicting flow entries. In one example, where the SDN controller has write access to the local flow entries in the forwarding table of the hybrid SDN switch, the SDN controller may delete the local flow entry so that the hybrid SDN switch follows the policy originally intended by the SDN controller.

Figure 8:
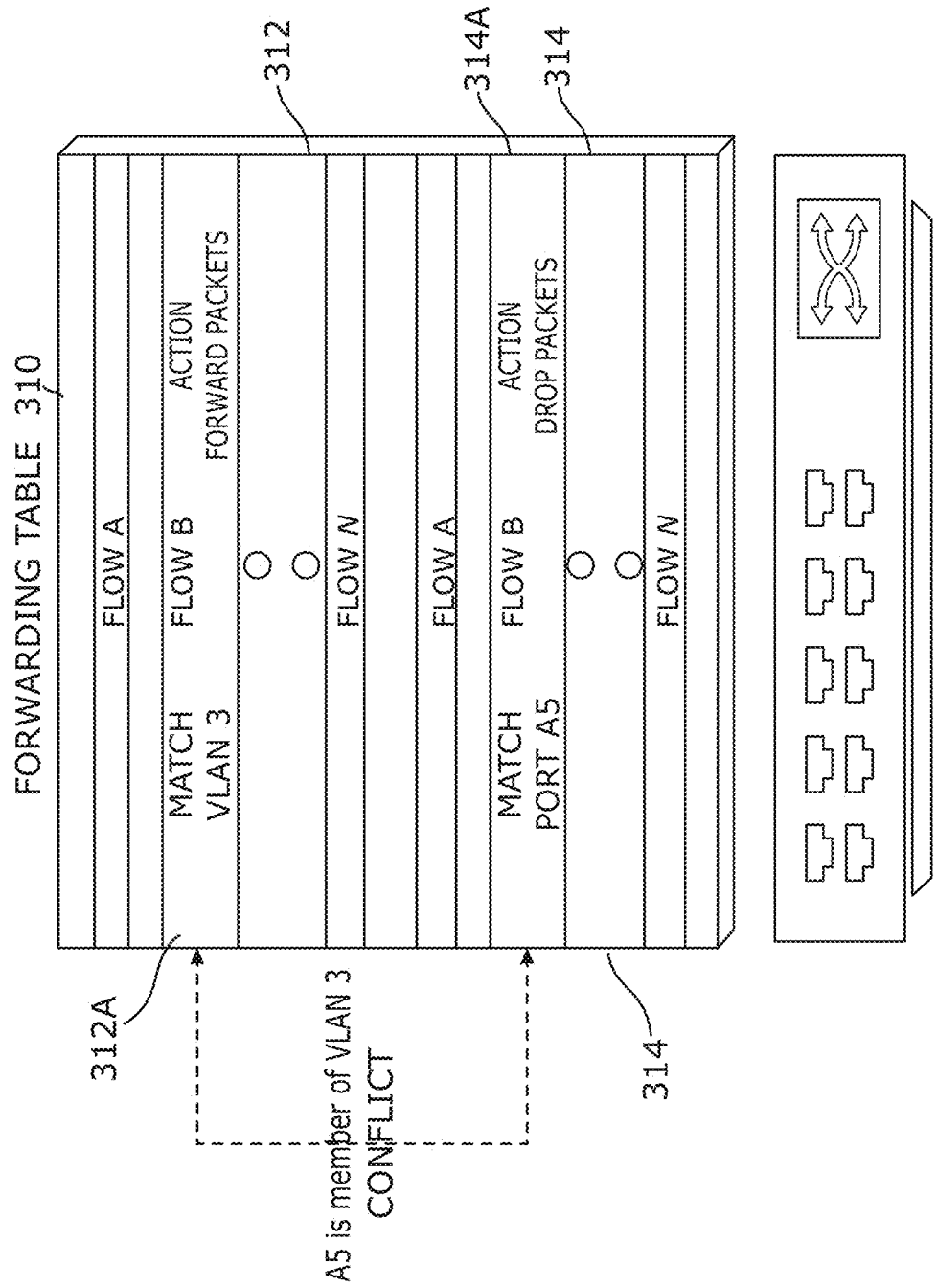
FIG. 8 shows an example of a security conflict.

FIG. 8 shows an example where there is a conflict that impacts security. The forwarding table 310 stores a plurality of SDN flow entries 312 and a plurality of local flow entries 314. One of the local flow entries 314A is an access control list that specifies that all traffic that ingresses on port A5 should be dropped. This may be for security reasons. Meanwhile, a SDN flow entry 312A, specifies that all traffic that ingresses on VLAN 3 should be forwarded through a particular port. If port A5 is a member of VLAN 3, then this would be a conflict and the SDN flow entry may cause the security policy of the local control plane to be circumnavigated. The SDN controller may detect such a conflict. For instance the SDN controller may generate an alert warning of the possibility of a conflict if A5 becomes a member of VLAN 3, or if A5 is already a member of VLAN 3, then the SDN controller may generate an alert warning of the conflict. The SDN controller may resolve the conflict, for example by preventing the SDN entry from being written to the hybrid SDN switch, by deleting the SDN entry if it has already been written, or by modifying the SDN entry to create an exception for port A5.

Figure 9:
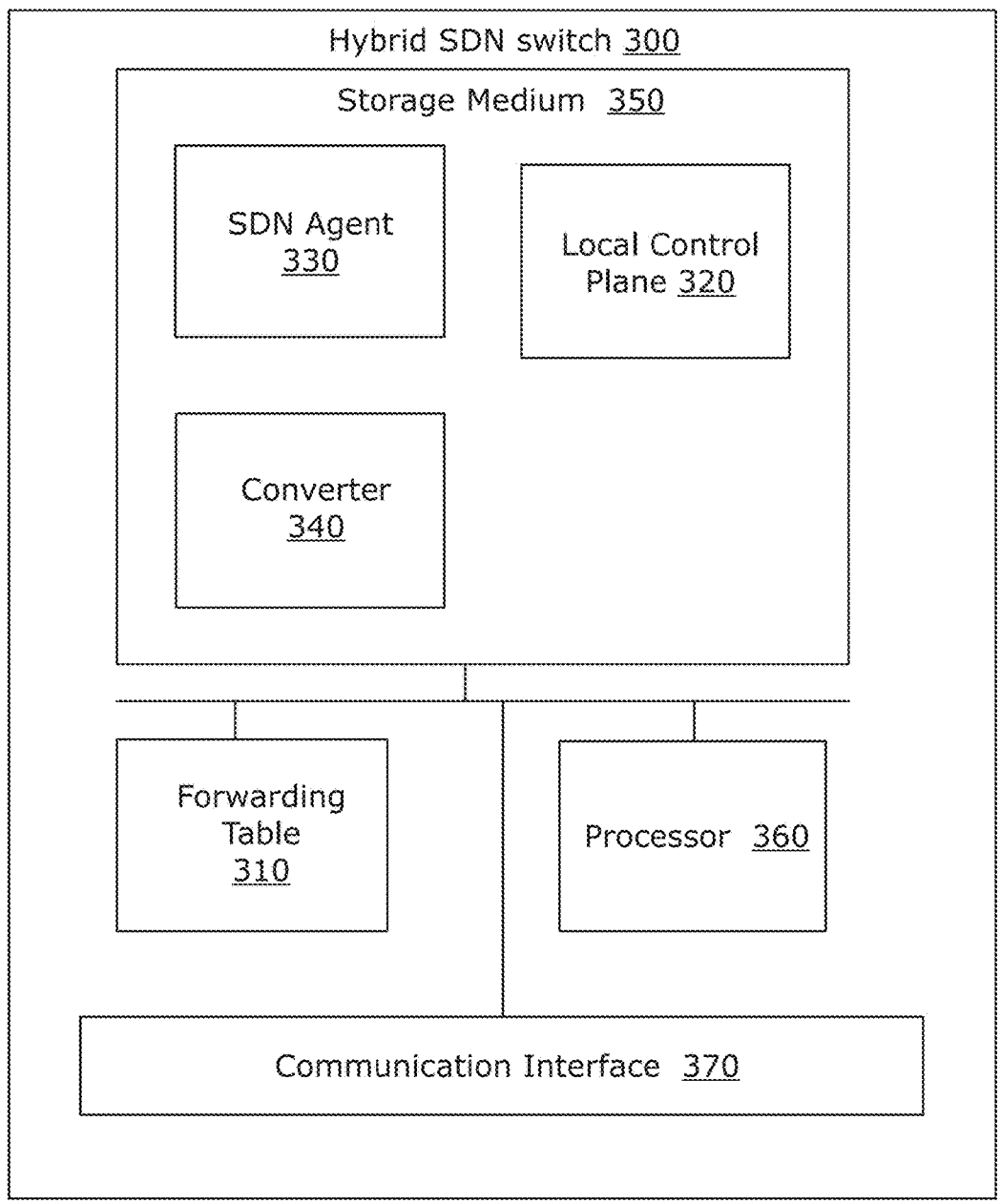
FIG. 9 shows an example of a hybrid SDN switch.

FIG. 9 is a schematic diagram showing an example of a hybrid SDN switch 300 capable of carrying out the above described methods. The switch includes a processor 360, such as a central processing unit (CPU), and a non-transitory machine readable storage medium 350 such as flash memory, a hard drive, random access memory (RAM) etc. The storage medium 350 stores modules of machine readable instructions that are executable by the processor 360. The modules may include a local control plane 320, SDN agent 330 and a converter 340 which will be described in more detail later.

The switch includes a communication interface 370, which may include a plurality of ports through which network traffic may be received and sent. The switch further includes a forwarding table 310 which is to store flow entries that determine what action will be taken on a flow received at a port of the communication interface. In some cases a flow may be forwarded directly based on the forwarding table, in other cases, for instance if there is no match in the forwarding table, the flow may be sent to the local control plane or to the SDN controller for further processing.

The forwarding table 310 may be stored on a non-transitory machine readable storage medium. A forwarding table may be a software forwarding table or a hardware forwarding table. A software forwarding table may be stored in a medium such as flash memory, hard disk or RAM etc and forwarding may be carried out by the processor 360 in accordance with the flow entries in the software forwarding table. A hardware forwarding table stores the entries in a non-transitory storage medium, such as a content addressable memory, for instance a TCAM, and the forwarding may be carried out by an application specific integrated chip (ASIC) or field programmable gate array (FPGA) associated with the hardware forwarding table. Hardware forwarding tables are in general much quicker than software forwarding tables and take load off the CPU of the switch, however the storage space can be expensive. Many switches therefore use a combination of hardware and software forwarding tables.

The SDN agent 330 is to set up a SDN channel with a SDN controller, handle SDN protocol communications on the SDN channel and read and write SDN flow entries to the forwarding table 310 in accordance with instructions received from the SDN controller.

The local control plane 320 is to read and write local flow entries to the forwarding table and to implement policies and take care of various higher level functions of the switch.

The converter 340 is to convert raw data from a hardware forwarding table, or local control plane format flow entries from a software forwarding table, to SDN format flow entries that may be sent to the SDN controller. The converter may be one module or two separate modules and in other examples may be part of the SDN agent and/or the local control plane. In still other examples, the converter may be a hardware ASIC or FPGA.

Figure 10:
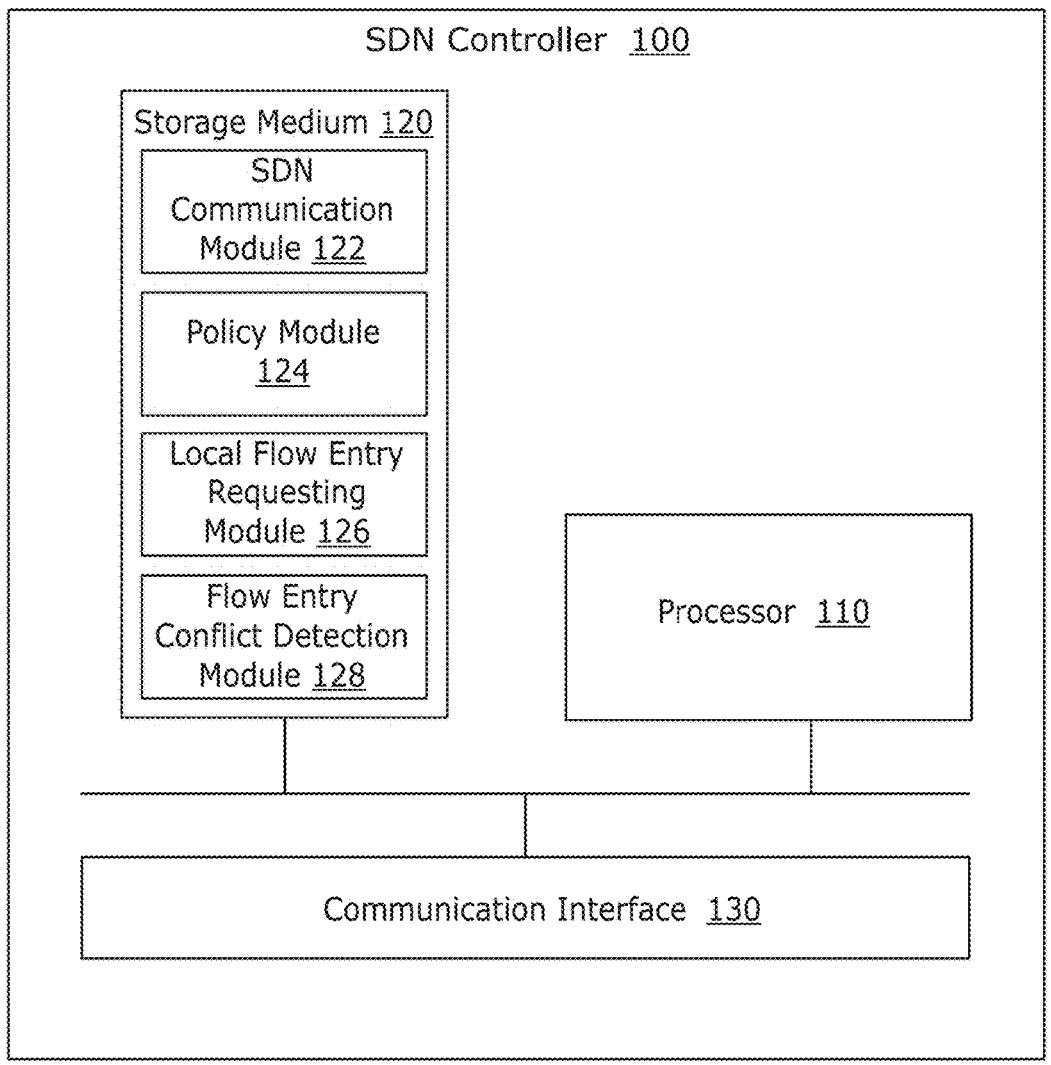
FIG. 10 shows an example of a SDN controller.

FIG. 10 shows an example of a SDN controller 100 capable of carrying out the methods described in the present disclosure. The SDN controller may be a computer device such as a server. The SDN controller includes a processor 110, such as a CPU, and a non-transitory storage medium 120 such as a hard disk, flash memory, random access memory (RAM) etc. The storage medium 120 stores modules of machine readable instructions which are executable by the processor 110. The modules may include a SDN communication module 122, a policy module 124, a local flow entry requesting module 126 and a flow entry conflict detection module 128.

The SDN communication module 122 is to set up SDN channels with external SDN capable switches, e.g. pure SDN switches or hybrid SDN switches and communicate with the switches over the SDN channels. The policy module 124 is to generate SDN flow entries and may include an operator interface and/or one or more SDN apps. The flow entry requesting module 126 is to request information about the access level to local flow entries which a forwarding table of a hybrid SDN switch will provide to the SDN controller. In some examples, the requesting module 126 may be part of the SDN communication module 122. The conflict detection module 128 is to detect conflict between a SDN flow entry and local flow entry in a forwarding table of a hybrid SDN switch. The conflict detection module may also generate an alert and/or take action to resolve a detected conflict.

The various methods, processes and modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and modules be implemented as machine readable instructions executable by one or more processors, hardware logic circuitry of the one or more processors or a combination thereof. The modules in the aforesaid examples can be combined into one module or further divided into a plurality of sub-modules.

What is claimed is:

1. A method comprising:
    a hybrid software defined networking (SDN) switch receiving from a SDN controller, over a software defined networking (SDN) channel, a request for flow entries from a forwarding table of the hybrid SDN switch;
    in response to receiving said request for flow entries from the forwarding table of the hybrid SDN switch, the hybrid SDN switch sending to the SDN controller, over the SDN channel, both SDN flow entries programmed into the forwarding table by a SDN controller and local flow entries programmed into the forwarding table by a local control plane of the hybrid SDN switch; and
    the SDN controller programming, in the forwarding table of the SDN hybrid switch, a SDN flow entry with an action of use local control plane; and
    the SDN controller predicting how a packet matching said SDN flow entry with an action of use local control plane will be forwarded, based on a local flow entry read by the SDN controller from the forwarding table of the hybrid SDN switch.

2. The method of claim 1 further comprising the hybrid SDN switch converting local flow entries from a local flow entry format into a SDN flow entry format before sending the local flow entries to the SDN controller.

3. The method of claim 1 comprising the hybrid SDN switch allowing a SDN controller to modify local flow entries in the forwarding table, if the forwarding table is set to allow writing by the SDN controller and not allowing the SDN controller to modify local flow entries if the forwarding table is set not to allow writing by the SDN controller.

4. The method of claim 1 comprising the hybrid SDN switch sending both SDN flow entries and local flow entries to the SDN controller in response to a request for flow entries of a forwarding table if the forwarding table is set to allow reading of local flow entries by the SDN controller, and sending SDN entries, but not sending local flow entries, if the forwarding table is set not to allow access to local flow entries by the SDN controller.

5. The method of claim 1 comprising the hybrid SDN switch informing the SDN controller that a permitted level of access by the SDN controller to local flow entries in a forwarding table of the hybrid SDN switch is one of: no access, read only access, or read and write access.

6. A non-transitory computer readable medium storing instructions executable by a processor of a software defined networking (SDN) controller to:
    send via a SDN channel, between the SDN controller and a hybrid SDN switch, a request for information about a forwarding table of the SDN hybrid switch;
    in response to said request for information about a forwarding table of the SDN hybrid switch, receive information indicating a level of permitted access by the SDN controller to local flow entries in the forwarding table;
    the SDN controller programming, in the forwarding table of the SDN hybrid switch, a SDN flow entry with an action of use local control plane; and
    the SDN controller predicting how a packet matching said SDN flow entry with an action of use local control plane will be forwarded, based on a local flow entry read by the SDN controller from the forwarding table of the hybrid SDN switch.

7. The non-transitory computer readable medium of claim 6 further comprising instructions to request the hybrid SDN switch to change a level of permitted access to local flow entries in a forwarding table of said SDN hybrid switch.

8. A method comprising:
    a software defined networking (SDN) controller sending, over a SDN channel linking the SDN controller with a hybrid SDN switch, a request for flow entries from a forwarding table of the hybrid SDN switch;
    the SDN controller receiving, over the SDN channel, SDN flow entries and local flow entries from the hybrid SDN switch;

the SDN controller detecting a conflict between a SDN flow entry and a local flow entry received from the hybrid SDN switch;

the SDN controller programming, in the forwarding table of the SDN hybrid switch, a SDN flow entry with an action of use local control plane; and the SDN controller predicting how a packet matching said SDN flow entry with an action of use local control plane will be forwarded, based on a local flow entry read by the SDN controller from the forwarding table of the hybrid SDN switch.

9. The method of claim 8 further comprising the SDN controller generating an alert relating to the conflict, or taking action to resolve the conflict.

10. The method of claim 8 comprising the SDN controller detecting a conflict between a Quality of Service (QoS) policy programmed by the SDN controller and a QoS policy programmed by a local control plane of the hybrid SDN switch.

11. The method of claim 8 comprising the SDN controller detecting a conflict between a security policy programmed by the SDN controller and a security policy programmed by a local control plane of the hybrid SDN switch.

12. The method of claim 8 comprising the SDN controller predicting how packets will be forwarded according to the local control plane of the hybrid SDN switch, based on local flow entries received by the SDN controller over the SDN channel.

13. A hybrid software defined networking (SDN) switch, comprising:

a forwarding table to store flow entries relating to forwarding of network traffic;

a local management plane to program local flow entries into the forwarding table;

a SDN agent to communicate with a SDN controller and to program SDN flow entries into the forwarding table;

a converter to convert local flow entries from a local flow entry format into a SDN flow entry format; wherein the SDN agent is to send SDN flow entries and local flow entries converted by the converter into a SDN format to the SDN controller; and the SDN controller programming, in the forwarding table of the SDN hybrid switch, a SDN flow entry with an action of use local control plane; and the SDN controller predicting how a packet matching said SDN flow entry with an action of use local control plane will be forwarded, based on a local flow entry read by the SDN controller from the forwarding table of the hybrid SDN switch.

14. The hybrid SDN switch of claim 13 wherein the SDN agent is to send a message to the SDN controller indicating a level of permitted access to local flow entries in the table by the SDN controller and to change the level of permitted access in response to a request by the SDN controller to change the level of permitted access.

* * * * *